United States Patent [19]

Shorb et al.

[11] Patent Number: 5,317,864

[45] Date of Patent: Jun. 7, 1994

[54] TANGENTIALLY DIRECTED AIR ASSISTED FUEL INJECTION AND SMALL ANNULAR COMBUSTORS FOR TURBINES

[75] Inventors: Linn C. Shorb; Michael W. Sledd; Jack R. Shekleton, all of San Diego, Calif.

[73] Assignee: Sundstrand Corporation, Rockford, Ill.

[21] Appl. No.: 954,971

[22] Filed: Sep. 30, 1992

[51] Int. Cl.⁵ .............................. F23R 3/32; F02C 7/22
[52] U.S. Cl. ...................................... 60/39.36; 60/740; 60/756
[58] Field of Search ...................... 60/39.36, 734, 737, 60/738, 740, 743, 739, 756, 758, 760; 239/423, 432, 523, 533.14; 431/403, 424

[56] References Cited

U.S. PATENT DOCUMENTS

| | | | |
|---|---|---|---|
| 2,926,495 | 3/1960 | Benson et al. | 60/759 |
| 3,099,134 | 7/1963 | Calder et al. | 60/747 |
| 3,531,937 | 10/1970 | Sneeden | 60/738 |
| 3,968,644 | 7/1976 | Fehler | 60/746 |
| 4,549,402 | 10/1985 | Saintsbury | 60/759 |
| 4,891,936 | 1/1990 | Shekleton et al. | 60/39.36 |
| 4,928,479 | 5/1990 | Shekleton et al. | 60/39.36 |

FOREIGN PATENT DOCUMENTS

| | | | |
|---|---|---|---|
| 728686 | 4/1932 | France | 60/760 |
| 367662 | 4/1963 | Switzerland | 60/759 |

Primary Examiner—Richard A. Bertsch
Assistant Examiner—Timothy S. Thorpe
Attorney, Agent, or Firm—Wood Phillips VanSanten Hoffman & Ertel

[57] ABSTRACT

Difficulties in downsizing annular combustors (20) due to orienting fuel injectors with respect to oxidant blast tubes are avoided in a construction for a combustor (20) including radially spaced annular walls (22, 24) and an interconnecting radial wall (26) defining an annular combustion chamber (32). A plurality of circumferentially spaced tubes (28, 30) extend through the radially outermost annular wall (24) and are directed generally tangentially into the combustion space (32). A plurality of fuel injectors (42) are provided for directing fuel radially inwardly into the space (32) and are circumferentially spaced about the combustion space (32) and located between the tubes (28).

12 Claims, 2 Drawing Sheets

TANGENTIALLY DIRECTED AIR ASSISTED FUEL INJECTION AND SMALL ANNULAR COMBUSTORS FOR TURBINES

FIELD OF THE INVENTION

This invention relates to turbines, and more specifically, to annular combustors and associated fuel injection systems therefore.

BACKGROUND OF THE INVENTION

The design of combustor systems for small turbines is much more than simply a scale down of designs that have been shown to be operative in large turbine engines. Regardless of combustor size, there is a minimum residence time for fuel and oxidant within the combustor necessary to effect sufficiently complete combustion to generate the gases of combustion required to drive a turbine wheel. Given the dynamics of gas flow in and out of a combustor to a turbine wheel, it will be readily appreciated that as the size of the combustor is decreased, if conventional techniques were employed, combustion would only be starting, if occurring at all, by the time the fuel oxidant mixture was exiting the combustor outlet.

Moreover, in small combustors, which necessarily provided with small fuel injectors and consequently having small fuel flow at each injector, it is difficult to provide the needed fine fuel atomization utilizing conventional techniques. This is due to the fact that small scale effects increase viscus losses resulting in a deterioration in fuel atomization at the injector. In addition, the small fuel metering orifices associated with such small fuel injectors tend to promote premature fuel spray deterioration due to orifice fouling which in turn can cause early engine failure due to gas temperature maldistributions. Conventional injector design techniques are ordinarily complex and costly. Consequently, when employed for reduced scale design for use in small combustors, it results in a very high additional cost.

Recognizing these difficulties, in recent years there has been a trend towards combustor systems employing so-called "sidewinding." Combustors used in sidewinding systems are annular combustors. Unlike conventional combustors, the path of travel for fuel and oxidant in the flame zone as well as the products of combustion is primarily in the circumferential direction around the annular combustor. The axial flow component of fuel, oxidant and products of combustion is minimized. This arrangement maximizes the time available for combustion within a given small volume and also permits a significant reduction in the number of fuel injectors without a resultant undesirably high turbine inlet temperature maldistribution as would be obtained using more conventional design techniques if the number of injectors is reduced. Maximizing the time available for mixing and combustion while minimizing the number of fuel injectors is most advantageous from cost and efficiency standpoints, particularly when accomplished in small turbines.

In recent proposals for annular combustors operating on the sidewinding technique, it is typical to find a series of oxidant blast tubes circumferentially spaced about the combustor and normally located in a radially outer wall thereof. One end of each tube is open to the interior of the combustor while the opposite end is opened to the space between the radially outer wall of the combustor and the outer combustor case. As is known, this space is typically charged with compressed oxidant from the compressor associated with a gas turbine engine or from a storage place such as a pressure bottle containing the oxidant. These tubes are directed tangentially into the annular combustion space of the combustor. For fuel injection purposes, fuel injection tubes have typically been mounted within the oxidant blast tubes. As a consequence, fuel atomization of fuel injected from the tubes may be achieved as the fuel is injected toward the combustion space in an associated oxidant blast tube as the oxidant passing through the oxidant blast tube provides oxidant blast atomization. While this works well for its intended purpose, as smaller and smaller combustors are designed, because the diameter of the oxidant blast tubes becomes commensurately reduced, it becomes increasingly difficult to locate the fuel injection tubes inside the oxidant blast tubes. Furthermore, space available for so called "start" injectors, which are typically pressure atomization injectors used only when the turbine is in a starting mode, and which are not always effective at high altitudes, is commensurately reduced.

It can be shown that the combustion process in a turbine engine requires a total time which is the sum of the times required for a) fuel evaporation, b) fuel-oxidant mixing, and c) fuel-oxidant reaction. The mixing of fuel and oxidant is speeded up in direct proportion to the reduction in scale and therefore does not pose a new problem in a small scale combustor. The fuel-oxidant reaction time can, for the most part, be assumed to be infinitely fast as compared to the time required for fuel-oxidant mixing and fuel evaporation and thus is negligible as far as small scale is concerned.

However, for a fixed fuel droplet size, the time for fuel evaporation is also fixed, independent of combustor size. As a consequence, as the combustor scale is reduced, an increasing proportion of the combustor volume must be devoted to fuel evaporation. Hence, the portion of total combustor volume devoted to fuel evaporation increases as scale is reduced.

In addition, the flame performance as defined by combustion efficiency and flame stability has been found by experience to suffer as a consequence. However, the problem of fuel evaporation may be avoided as scale is reduced by reducing the fuel droplet size. As is well known, the time required for fuel evaporation is more or less inversely proportional to the square of fuel droplet size. Using conventional fuel injection design methods, the fuel droplet size tends to increase with reduced scale, primarily due to viscus loss effects. Consequently, novel design techniques are needed to improve the fuel atomization while avoiding the cost and reliability problems usually associated with small size fuel injectors.

The present invention is directed to overcoming one or more of the above problems.

SUMMARY OF THE INVENTION

It is a principal object of the invention to provide a new and improved annular combustor and associated fuel system. More specifically, it is an object of the invention to provide such a system that avoids difficulties in locating fuel injection tubes with respect to oxidant blast tubes, and which further avoids the need for so-called start injectors or pressure atomization injectors used for start purposes. At the same time, it is an object of the invention to provide such a combustor that is simple and of low cost and employs injectors which improve fuel atomization.

An exemplary embodiment of the invention achieves the foregoing objects in an annular combustor including walls defining an annular combustion space having an outlet, means for injecting only an oxidant into the space in a tangential direction at a plurality of circumferentially spaced locations about the combustion space, and fuel injectors for injecting atomized fuel in a generally radially inward direction between at least some of the locations of the oxidant injecting means.

As a consequence of this construction, it is not necessary to dispose the fuel injectors within the oxidant blast passages. At the same time, good fuel atomization is achieved as the fuel is moving generally across oxidant moving in a circumferential direction around the annular space as a result of its injection through the oxidant injecting means.

In a highly preferred embodiment, each fuel injector includes a fuel injecting tube having an injection end and a pressurized oxidant conduit associated therewith for bringing pressurized, gaseous oxidant into intimate contact with fuel in the tube at or before the injection end to provide a high degree of atomization of the fuel.

In a highly preferred embodiment, the injection of fuel occurs in a radially inward direction.

The invention, in one embodiment, contemplates the provision of a pressure vessel for storing oxidant under high pressure along with means for connecting the oxidant conduit to the vessel.

In one embodiment of the invention, the oxidant conduit has an end in surrounding relation to the fuel tube end.

Preferably, when the invention is used in a small combustor of, say, about four inches outside diameter. The oxidant conduit end has an inner diameter of no more than about 0.1 inches and the fuel tube end has an outer diameter of no more than about 0.08 inches. In one embodiment of the invention, there is provided a turbine wheel rotatable about an axis, a nozzle for directing gas at the turbine wheel and means for connecting the nozzle to the outlet of the combustor.

In a highly preferred embodiment, the fuel injector tubes are simple tubes and the oxidant blast tubes are not of appreciably larger diameter in comparison thereto.

Preferably, where the oxidant tubes are in surrounding relation to each of the simple tubes, the difference between the inner diameter of the oxidant tubes and the outer diameter of the simple tubes is on the order of 0.02 inches.

In a highly preferred embodiment, the inner diameter of the simple tubes is no more than about 0.05 inches.

In one embodiment of the invention, the wall sections defining the annular combustion space have a common centerline and the oxidant blast tubes are in a first common plane transverse to the centerline and adjacent a side of the combustor which is closed by a wall and opposite the outlet. The fuel injectors are in a second common plane transverse to the centerline and the first and second common planes are spaced from each other a distance in the range of about 0 to 3D, where D is the diameter of the oxidant blast tubes.

Other objects and advantages will become apparent from the following specification taken in connection with the accompanying drawings.

DESCRIPTION OF THE PREFERRED EMBODIMENT

Figure 1:
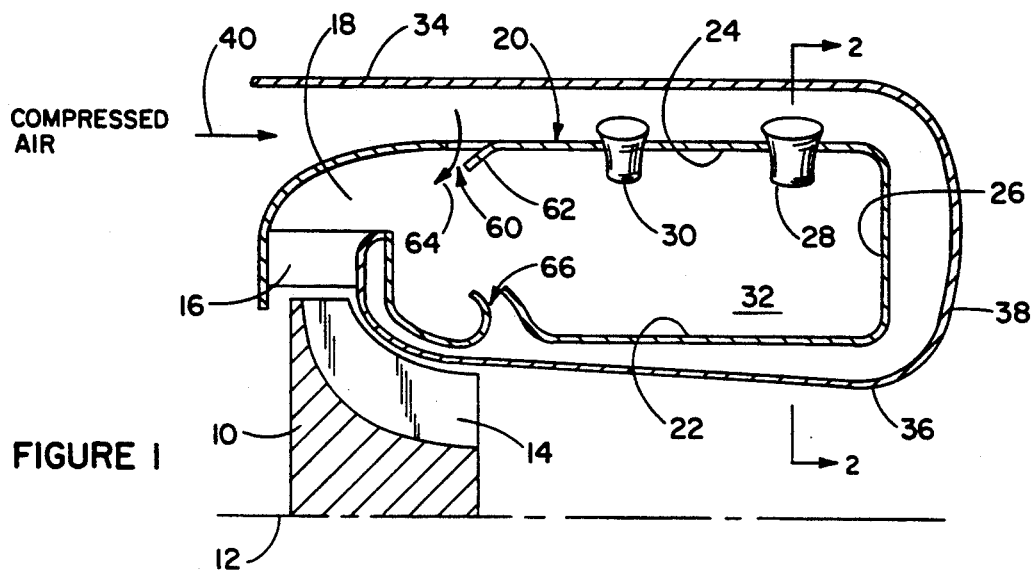
FIG. 1 is a somewhat schematic, partial sectional view of part of a turbine embodying the invention and illustrating a combustor, a turbine wheel and a nozzle.

An exemplary embodiment of the invention is illustrated in the drawings and with reference to FIG. 1 is seen to include a turbine wheel 10 rotatable about an axis 12. The turbine wheel 10 includes a plurality of blades 14 which receive hot gases of combustion directed at them by an annular nozzle 16 made up of a plurality of vanes as is well-known. While as illustrated, the turbine wheel 10 is a radial turbine, it should be understood that the invention is applicable to any sort of machine utilizing an annular combustor and is not limited to radial turbines.

Figure 2:
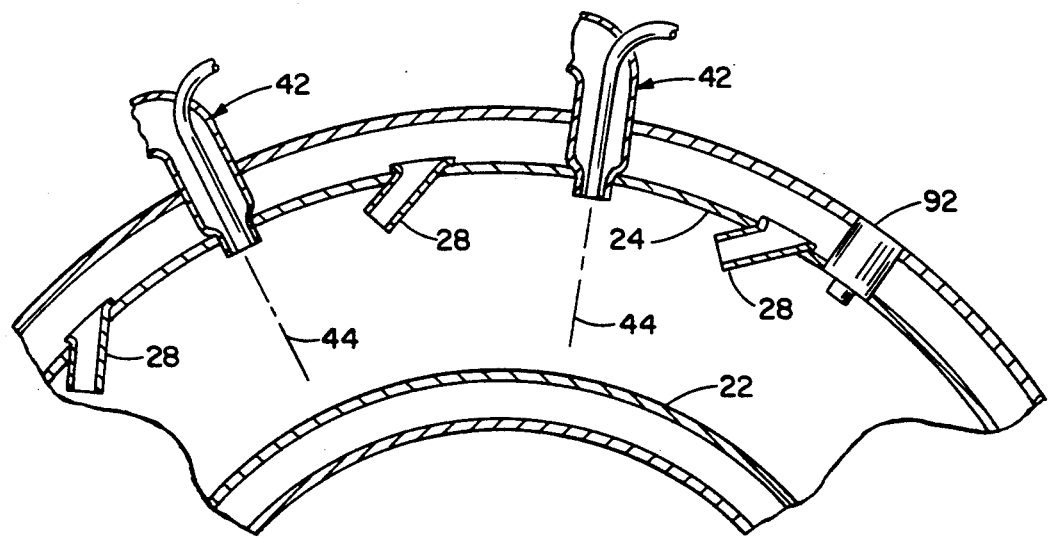
FIG. 2 is an enlarged, fragmentary view taken approximately along the line 2—2 in FIG. 1.

The nozzle 16 is at the outlet 18 of an annular combustor, generally designated 20. The annular combustor 20 includes a radially inner axially extending wall 22, a radially outer, axially extending wall 24 and a radially extending wall 26 joining the inner and outer walls 22 and 24 at a side thereof opposite the outlet 18. One or more rows of oxidant blast tubes 28, 30 are located in the radially outer wall 24 and, as can be seen in FIG. 2, are directed generally tangential to an annular combustion space 32 defined by the walls 22 and 24. The oxidant blast tubes 28, 30 are open and unobstructed. They are free of fuel injecting devices or any other means that would resist the flow of oxidant through them.

A combustor case includes an outer wall 34 spaced outwardly of the radially outer wall 24 of the combustor, an inner wall 36 spaced radially inward of the radially inner wall 22 of the combustor 20 and a radially extending wall 38 that is axially spaced from the end wall 26 of the combustor 20. As shown by the legend and associated arrow 40, oxidant is introduced into the space between the combustor and the combustor case. The compressed oxidant may be obtained from a compressor driven by the turbine wheel 10, or if the system is employed as part of an emergency power unit, or a combined emergency power unit and auxiliary power unit, the compressed oxidant indicated by the arrow 40 may be taken from a storage source of oxidant such as a pressure vessel or, in some cases, from such a storage source or from a rotary compressor driven by the turbine wheel 10, depending upon the mode of operation.

A plurality of circumferentially spaced fuel injectors, each designated generally 42, are circumferentially spaced about the annular combustor space 32. Generally, the number of fuel injectors 42 will equal the number of oxidant blast tubes 28, but that need not always be true. Generally, as well, the fuel injectors 42 will be located midway between two of the injectors tubes 28, but again, that need not always be true.

Generally, as well, the injectors 42 will inject fuel through the radially outer wall 24 into the combustor space 32, but dependent upon space availability, it is also possible that the injection occur through the radially inner wall 22.

Each of the injectors 42 will inject more or less on a radial line such as those shown at 44 in FIG. 2. As is well-known, the walls 22 and 24 will have a common centerline which will be coincident with the rotary axis 12 of the turbine wheel 10. The lines 44 are radii extending from such centerline. While some deviation from a true radius may be tolerated, tests have shown that best combustion results occur when injection is nominally on a true radius.

This arrangement provides for injection of the fuel across the circumferentially traveling oxidant entering the combustion space 32 through the tangentially oriented oxidant blast tubes 28. The differences in relative velocities of the fuel and incoming oxidant promote good atomization, rapid evaporation and mixing of the fuel in the oxidant.

Figure 3:
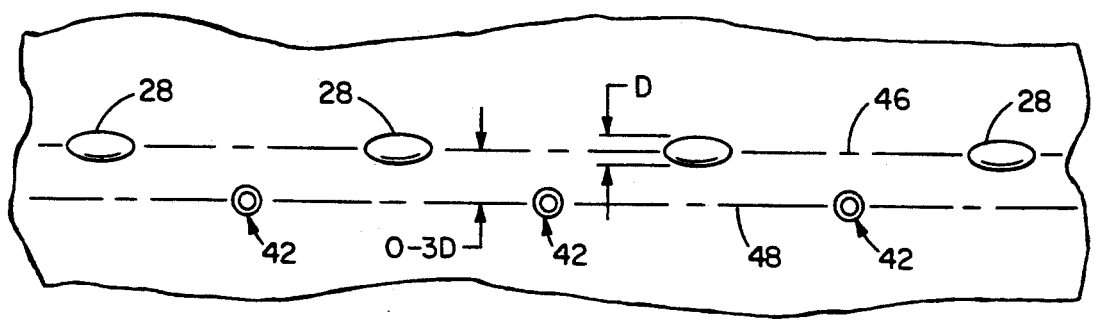
FIG. 3 is a developed view of part of the combustor.

As can be appreciated from FIGS. 2 and 3, the oxidant blast tubes 28 are in a common plane which is perpendicular to the rotational axis 12 of the turbine wheel. This plane is shown by a dotted line designated 46 in FIG. 3.

The fuel injectors 42 are also in a common plane which is given the dotted line designation 48 in FIG. 3. The planes 46 and 48 may or may not coincide. They seldom will be spaced by a distance greater than about three times the diameter of the oxidant blast tubes 28. Thus, FIG. 3 shows a dimension "D" as the diameter of the oxidant blast tubes 28 at the point at which they pass through the radially outer wall 24 and also shows a spacing between the planes 46 and 48 ranging from O to D, where such D is the diameter of the oxidant blast tubes mentioned previously.

Typically, the plane 48 will be close to the plane 46 while the plane 46 will be closely adjacent to the radially extending wall 26 of the combustor 20.

Referring to the oxidant blast tubes 30, same may lie in a plane transverse to the axis 12 to the side of the oxidant blast tubes 28 nearest the outlet 18. Typically, the spacing will be approximately ten diameters D.

The oxidant blast tubes 30 are intended to inject oxidant tangentially in the same direction and more or less at the same angle as the oxidant blast tubes 28. Typically, the oxidant blast tubes 30 will be sized so that about half the oxidant required for complete combustion enters through the oxidant blast tubes 28 and the remaining half through the oxidant blast tubes 30.

Approximately ten diameters D toward the outlet 18 from the oxidant blast tubes 30, a circumferential array of dilution apertures 60 are provided in the radially outer wall 24. The number and size of the openings 60 is selected so that the amount of oxidant flowing through those holes will safely dilute the hot gasses of combustion to a temperature that is sufficiently low for safe operation of the turbine as is well known.

When the direction of the incoming compressed oxidant is as illustrated by the arrow 40 in FIG. 1, each of the opening 60 is provided with a deflector plate 62 that extends slightly into the interior of the combustor. The deflector plates 62 serve to deflect incoming oxidant in the direction of an arrow 64 toward the outlet 18. Without the deflector plates 62, oxidant could enter the flame zone within the combustor and cause a serious reduction in combustion efficiency and flame stability. Typically, entry of the gasses to the turbine nozzle 60 from the outlet 18 is at a spacing of approximately 5 diameters D.

As an alternative to the use of the opening 60, a series of openings 66 in the radially inner wall 22 may be used. In this case, the opening 60 and associated deflector plates 62 may be eliminated. Use of the opening 66 provides an additional advantage in that oxidant entering the combustor through the opening 66 flows almost entirely about the combustor and thus serves to cool the walls 22, 24 and 26. At the same time, the use of the opening 66 may require an increase in the size of the combustor case defined by the walls 34, 36 and 38 to accommodate the necessary oxidant flow which in turn would necessarily, but undesirably, increase the diameter of the entire combustor assembly, and thus the diameter of the engine as well.

Figure 4:
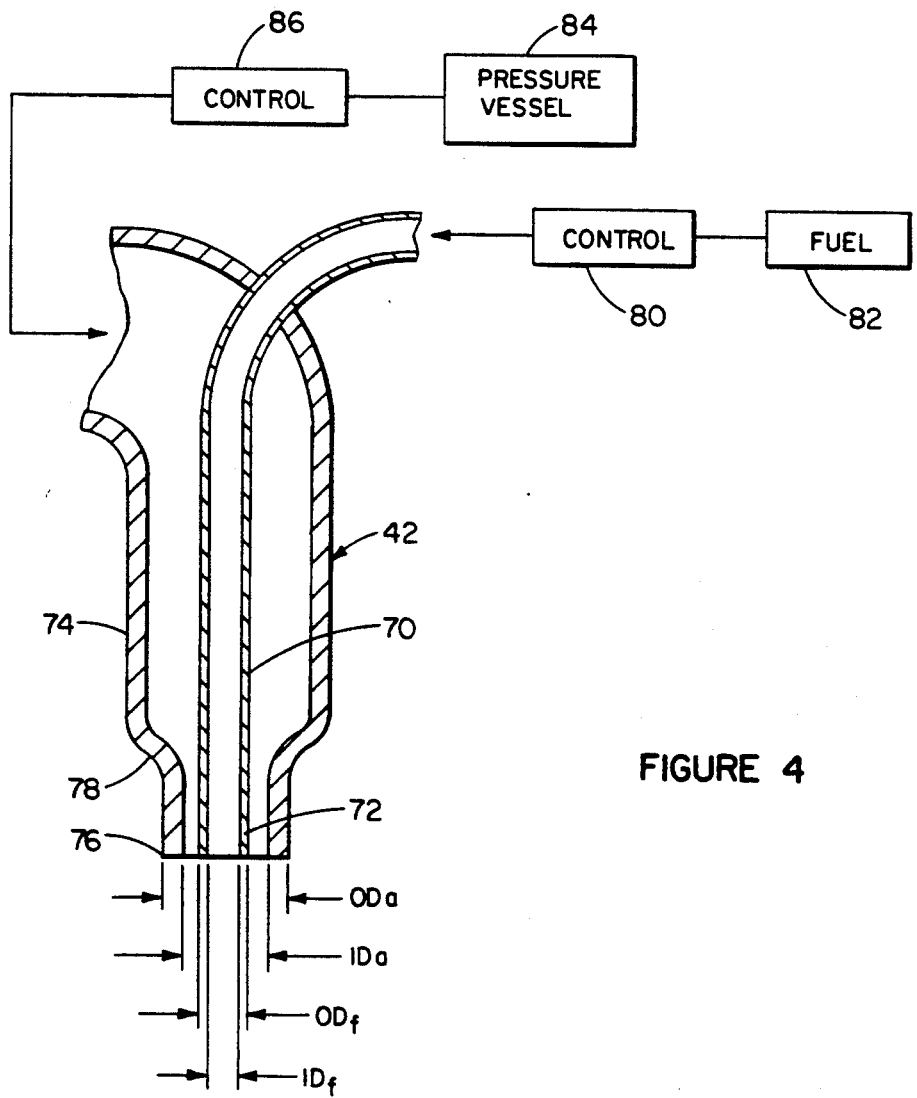
FIG. 4 is an enlarged, fragmentary, partial schematic, partial sectional view of a fuel injector.

Turning now to FIG. 4, an exemplary one of the fuel injectors 42 will be described. The basic injector includes a simple tube 70 terminating in a fuel injection end 72. By the term "simple tube" it is meant a tube formed by conventional tube making techniques as opposed to an opening or passage in a body that is machined therein. It will typically be cylindrical in shape where not bent or curved and of uniform cross section along its length. The only operations that might be performed on the tube 70 would be, for example, deburring the end 72.

It will be readily appreciated that use of a simple tube as the fuel injecting tube 70 provides an extremely low cost injector. The tubes 70 are of small diameter in comparison to the oxidant blast tubes 28.

According to the invention, the tube 70, and particularly that part of the tube 70 having the fuel injecting end 72, is surrounded by an oxidant tube 74. The tube 74 is larger than the tube 70 and typically will have an oxidant discharging end 76 which is swaged down in the area beginning at 78. Except for the swaging and deburring, the tube 74 may also be a simple tube as defined previously. The tube ends 72 and 76 are nominally coplanar.

The tube 70 may be connected to any suitable manifold as is well-known to receive fuel from a fuel control 80 which is operative to control the flow of fuel from a source 82.

The oxidant tube 54 receives gaseous oxidant under pressure from an oxidant storage source such as a pressure vessel 84. The pressure vessel provides oxidant under high pressure to a control 86 which may reduce the same to, for example, 20 psia when the oxidant supply is, for example, 15 psi. Thus, a pressure ratio of approximately 20/15 or 1.33/1 is provided. Consequently, a change in the oxidant supply pressure to the combustor, the pressure to the injectors 42 will be changed in like proportion for best results.

As can be readily appreciated from FIG. 4, the oxidant tube 74 surrounds the fuel tube 70. While it is preferred that the fuel tube 70 be centered within the oxidant tube 74, it has been found that such makes very little difference in the matter of atomizing fuel injected out of the end 72 of the fuel tube 70. The relatively high pressure stored oxidant blasts the emanating fuel stream, breaking the same up and providing excellent atomization. In this connection, particularly for relatively small combustors, in order to achieve desired velocities to achieve good atomization, it is desirable that certain dimensional characteristics be met. Thus, for example, it is desirable that the inner diameter of the fuel tube 74 at the end 76, shown as $ID_a$ in FIG. 4 be no more than about 0.1 inches and in a preferred embodiment, is 0.082 inches. In such a case, the outer diameter of the oxidant tube 74 at the end 76, shown as $OD_a$ in FIG. 4 has a preferred value of 0.125 inches.

In the exemplary embodiment, the outer diameter of the fuel tube 70, shown as $OD_f$ in FIG. 4, will be no more than about 0.08 inches and in a preferred embodiment, will be 0.0625 inches. The inner diameter of the fuel tube 70, $ID_f$, is 0.042 inches. Generally speaking, the dimensions given immediately preceding are chosen for convenience and low cost as they are typical of readily available, so-called "off the shelf"tubing. It has been found that the foregoing dimensions provide injectors that work with efficacy in a combustor having a four inch outer diameter. For somewhat larger combustors, these dimensions might be scaled up generally in proportion to the ratio of the outer diameter of the larger combustor to a four inch combustor.

Generally speaking, it is preferred that the difference between the inner diameter $ID_a$ of the tube end 76 and the outer diameter $OD_f$ of the fuel tube 70 be on the order of 0.02 inches. This value is not critical and wider or narrower gaps may be tolerated. However, with a wider gap, a higher oxidant flow rate will be required but at a lower pressure. While this is tolerable, when the system is employed on an aircraft, it may necessitate that the size of the pressure vessel 84 be increased to assure an adequate supply of oxidant. Given the fact that bulk and weight considerations are always of concern on aircraft, it is preferable that the vessel 84 be of the smallest size possible and capable of holding the highest pressures, and the particular gap stated achieves the desired small size while also achieving maximum atomization. Also, it is desirable that the fuel tube 70 be provided with an internal orifice as shown at 90 to provide altitude compensation. In some instances, a gap smaller than 0.02 inches may be advantageous. Such a smaller gap will be associated with a higher pressure and a lower flow rate.

It has been found that injectors such as the injectors 42, when coupled to a pressure vessel 84, and thus provided with an oxidant assist for atomization, are so effective in achieving good atomization that the same are capable of achieving high altitude ignition at, for example, altitudes of 45,000 feet. Thus, the typical start injector or injectors employed with many turbine engines, which typically are pressure atomization devices, may be eliminated entirely. This reduces the complexity of the system and eliminates all of the undesirable possibilities that occur through the use of start injectors. It is only necessary to provide an ignitor such as shown at 92 in approximately the plane 48 at any convenient circumferential position.

From the foregoing, it will be appreciated that a combustor system made according to the invention is ideally suited for use with small sized combustors and achieves excellent atomization, allowing the elimination of start injectors. Further, the components employed in fabricating the injectors 42 are inexpensive, thereby providing a low cost system as well.

We claim:

1. In an annular combustor for fuel with an oxidant to provide gases of combustion for driving a turbine wheel about an axis, the combination of:

radially spaced inner and outer wall sections joined at one side to define an annular combustion space and spaced from one another opposite said one side to provide an outlet connectable to a turbine nozzle;

a plurality of oxidant blast tubes disposed in circumferentially spaced relation extending through said outer wall section into said space in a direction generally tangential thereto for injecting oxidant into said space in a direction generally tangential thereto, said oxidant blast tubes being open and unobstructed; and a plurality of fuel injectors circumferentially spaced about said combustor and each located between two of said oxidant blast tubes, each said fuel injector being mounted on one of said wall sections and in fluid communication with said space and including a generally radially directed fuel tube having an open end through which fuel may be injected into said space in a generally radial direction toward said axis and across circumferentially travelling oxidant therein, and a generally radially directed oxidant tube surrounding said fuel tube end and adapted to be connected to a source of oxidant under pressure to provide for oxidant blast atomization of fuel injected through said fuel tube.

2. The annular combustor of claim 1 wherein said fuel injectors are located about said radially outer wall section and said fuel tube ends open radially inwardly.

3. The annular combustor of claim 1 wherein said wall sections have a common centerline and said oxidant blast tubes are in a first common plane transverse to said centerline and adjacent said one side; and said fuel injectors are in a second common plane transverse to said centerline, said first and second common planes being spaced a distance in the range of about 0 to 3D where D is the diameter of the oxidant blast tubes.

4. An annular combustor comprising:

a) means, including walls, defining an annular combustion space having an outlet and said annular combustion space being annular about an axis;

b) means for injecting only an oxidant into said space in a tangential direction at a plurality of circumferentially spaced locations about said space; and c) fuel injectors for injecting atomized fuel into said space in a generally radial direction toward said axis across the path of oxidant flow therein between at least some of said locations, and each including a fuel tube having an injection end and a pressurized oxidant conduit associated therewith for bringing pressurized gaseous oxidant into intimate contact with fuel in said tube at or before said injection end to provide a high degree of atomization of said fuel.

5. The annular combustor of claim 4 wherein said oxidant conduit has an end in surrounding relation to said fuel tube end in nominally coplanar relation thereto.

6. The annular combustor of claim 5 further including a pressure vessel for storing oxidant under high pressure, and means connecting said oxidant conduit to said vessel.

7. The annular combustor of claim 6 wherein said conduit end has an inner diameter of no more than about 0.1 inches and said fuel tube end has an outer diameter of no more than about 0.08 inches.

8. The annular combustor of claim 4 further including a turbine wheel rotatable about an axis, a nozzle for directing gas at said turbine wheel and means connecting said nozzle to said outlet.

9. An annular combustor comprising:

annular walls spaced radially about an axis and an interconnecting radial wall defining an annular combustion space;

a plurality of circumferentially spaced oxidant blast tubes extending through the radially outermost of said annular walls and directed generally tangentially into said space for causing circumferential flow of oxidant in said space; and a plurality of fuel injectors for directing fuel radially inwardly toward said axis into said space across said circumferential flow and being circumferentially spaced about said space and located between said tubes.

10. The annular combustor of claim 9 wherein said fuel injectors are simple tubes and said circumferentially spaced tubes are of large diameter in comparison thereto.

11. The annular combustor of claim 10 further including oxidant tubes in surrounding relation to each of said simple tubes and adapted to be connected to a source of high pressure gaseous oxidant, the difference between the inner diameter of said oxidant tubes and the outer diameter of said simple tubes being on the order of about 0.02 inches.

12. The annular combustor of claim 10 wherein the inner diameter of said simple tubes is no more than about 0.05 inches.

* * * * *